(12) United States Patent
Wang

(10) Patent No.: US 12,098,767 B2
(45) Date of Patent: Sep. 24, 2024

(54) PLANETARY CARRIER AND GEAR BOX

(71) Applicant: ZF WIND POWER (TIANJIN) CO., LTD., Tianjin (CN)

(72) Inventor: Fuliang Wang, Tianjin (CN)

(73) Assignee: ZF WIND POWER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/556,093

(22) PCT Filed: Mar. 7, 2022

(86) PCT No.: PCT/CN2022/079561
§ 371 (c)(1),
(2) Date: Oct. 19, 2023

(87) PCT Pub. No.: WO2022/222624
PCT Pub. Date: Oct. 27, 2022

(65) Prior Publication Data
US 2024/0218927 A1 Jul. 4, 2024

(30) Foreign Application Priority Data

Apr. 21, 2021 (CN) .......................... 202120828482.5

(51) Int. Cl.
*F16H 57/08* (2006.01)
*F03D 15/10* (2016.01)

(52) U.S. Cl.
CPC ......... *F16H 57/082* (2013.01); *F03D 15/101* (2023.08); *F05B 2260/40311* (2013.01)

(58) Field of Classification Search
CPC ................. F16H 57/082; F03D 15/101; F05B 2260/40311
(Continued)

(56) References Cited

U.S. PATENT DOCUMENTS

| 3,939,736 A | 2/1976 | Morin |
| 8,550,957 B2 * | 10/2013 | Erno ..................... F16H 1/2836 475/331 |

(Continued)

FOREIGN PATENT DOCUMENTS

| CN | 1793701 A | 6/2006 |
| CN | 200986018 Y | 12/2007 |

(Continued)

*Primary Examiner* — Roger L Pang
(74) *Attorney, Agent, or Firm* — LEYDIG, VOIT & MAYER, LTD.

(57) ABSTRACT

A planetary carrier, including an input flange, a first web plate connected to the input flange, a second web plate arranged opposite the first web plate, a first support plate connected to a side of the first web plate that faces the second web plate and parallel to the first web plate, and a second support plate connected to a side of the second web plate that faces the first web plate and parallel to the second web plate, the first and second support plates being arranged opposite each other. The side of the first support plate includes a plurality of first support portions. A number of first support portions is the same as that of planetary gear shafts. The side of the second support plate includes second support portions corresponding to the first support portions. Each first support portion and respective second support portion support one planetary gear shaft.

10 Claims, 7 Drawing Sheets

(58) Field of Classification Search
USPC .......................................................... 475/331
See application file for complete search history.

(56) References Cited

U.S. PATENT DOCUMENTS

| | | | |
|---|---|---|---|
| 10,662,879 B2* | 5/2020 | Desjardins | ................ F02C 7/36 |
| 2002/0022545 A1* | 2/2002 | Shattuck | ............... F16H 57/082 |
| | | | 475/331 |
| 2010/0202885 A1 | 8/2010 | Demtroeder et al. | |
| 2012/0322607 A1 | 12/2012 | Noller et al. | |
| 2014/0206498 A1* | 7/2014 | Harada | ................ F16H 57/082 |
| | | | 475/331 |
| 2016/0201794 A1 | 7/2016 | Gravina | |
| 2017/0219088 A1 | 8/2017 | Hoelzl | |
| 2018/0051798 A1 | 2/2018 | Klein-Hitpass | |

FOREIGN PATENT DOCUMENTS

| | | |
|---|---|---|
| CN | 101849105 A | 9/2010 |
| CN | 105422824 A | 3/2016 |
| CN | 205841717 U | 12/2016 |
| CN | 106715972 A | 5/2017 |
| CN | 107763196 A | 3/2018 |
| CN | 107781402 A | 3/2018 |
| CN | 110185779 A | 8/2019 |
| CN | 110686071 A | 1/2020 |
| CN | 210661311 U | 6/2020 |
| CN | 210949825 U | 7/2020 |
| CN | 111853220 A | 10/2020 |
| CN | 215293537 U | 12/2021 |
| DE | 102011104291 A1 | 12/2012 |

\* cited by examiner

PLANETARY CARRIER AND GEAR BOX

CROSS REFERENCE TO RELATED APPLICATIONS

This application is a U.S. National Phase application under 35 U.S.C. § 371 of International Application No. PCT/CN2022/079561, filed on Mar. 7, 2022, and claims benefit to Chinese Patent Application No. CN 202120828482.5, filed on Apr. 21, 2021. The International Application was published in Chinese on Oct. 27, 2022 as WO 2022/222624 A1 under PCT Article 21(2).

TECHNICAL FIELD

Field

The present invention relates to a planetary carrier and a gear box, and in particular, to a planetary carrier in which planetary gears are less prone to deviation, and a wind turbine gear box comprising the planetary carrier.

Background

Currently, in the majority of wind turbine gear boxes, a planetary gear set is used to transmit torque. As shown in FIGS. 1-2, the planetary gear set comprises a planetary carrier, a ring gear, a plurality of planetary gears 20 meshing with the ring gear and a sun gear meshing with the planetary gears, wherein the planetary gears 20 are arranged on planetary gear shafts 40 by means of bearings 30, and the planetary gear shafts 40 are supported in the planetary carrier. A typical planetary carrier comprises a first web plate 101 and a second web plate 102 arranged opposite each other. The first web plate 101 and the second web plate 102 are respectively provided with support portions 401, 402 for arranging the planetary gear shafts 40 for supporting the planetary gears 20. Generally, the planetary gear shafts 40 are mounted to the support portions 401, 402 by means of interference fit, and the planetary gear shafts 40 themselves are fixed to the planetary carrier by means of bolts 50. In such an arrangement, the planetary gears 20 rotates with the planetary carrier, but there is no relative movement between the planetary gear shafts 40 and the planetary carrier due to the fixing of the bolts 50.

The planetary carrier (especially a first-stage planetary carrier near a wind wheel) is used as an input end component to transmit a torque load and a bending load of the wind wheel to a gear box. These loads would cause different degrees of deformation to the first web plate and the second web plate of the planetary carrier, which in turn would result in the deviation of the planetary gear shafts. Therefore, in the operation of the gear box, such a deviation would directly lead to an uneven load when the planetary gears mesh with the ring gear and the sun gear, and ultimately affect the strength and service life of a planetary gear train.

SUMMARY

In an embodiment, the present disclosure provides a planetary carrier, comprising an input flange, a first web plate connected to the input flange, a second web plate arranged opposite the first web plate, a first support plate connected to a side of the first web plate that faces the second web plate and parallel to the first web plate, and a second support plate connected to a side of the second web plate that faces the first web plate and parallel to the second web plate, the first support plate and the second support plate being arranged opposite each other. The side of the first support plate that faces the second support plate is provided with a plurality of first support portions. A number of first support portions is the same as that of planetary gear shafts. The side of the second support plate that faces the first support plate is provided with second support portions corresponding to the first support portions. Each first support portion and the second support portion corresponding to the respective first support portion are used for supporting one planetary gear shaft. A first recessed portion is formed in the respective first support plate between every two adjacent first support portions. A second recessed portion is formed in the respective second support plate between every two adjacent second support portions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
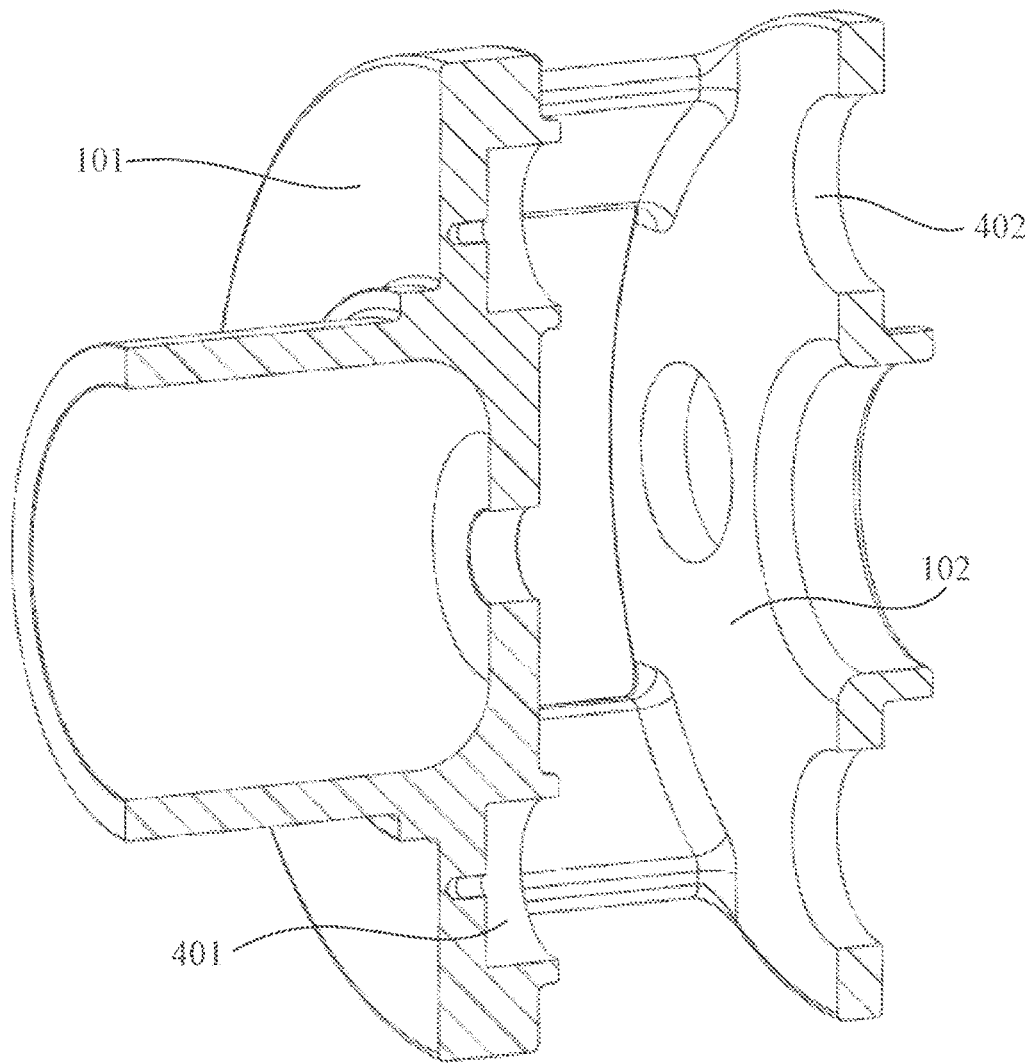
FIG. 1 shows a schematic diagram of a planetary carrier in the prior art without planetary gears.
Figure 2:
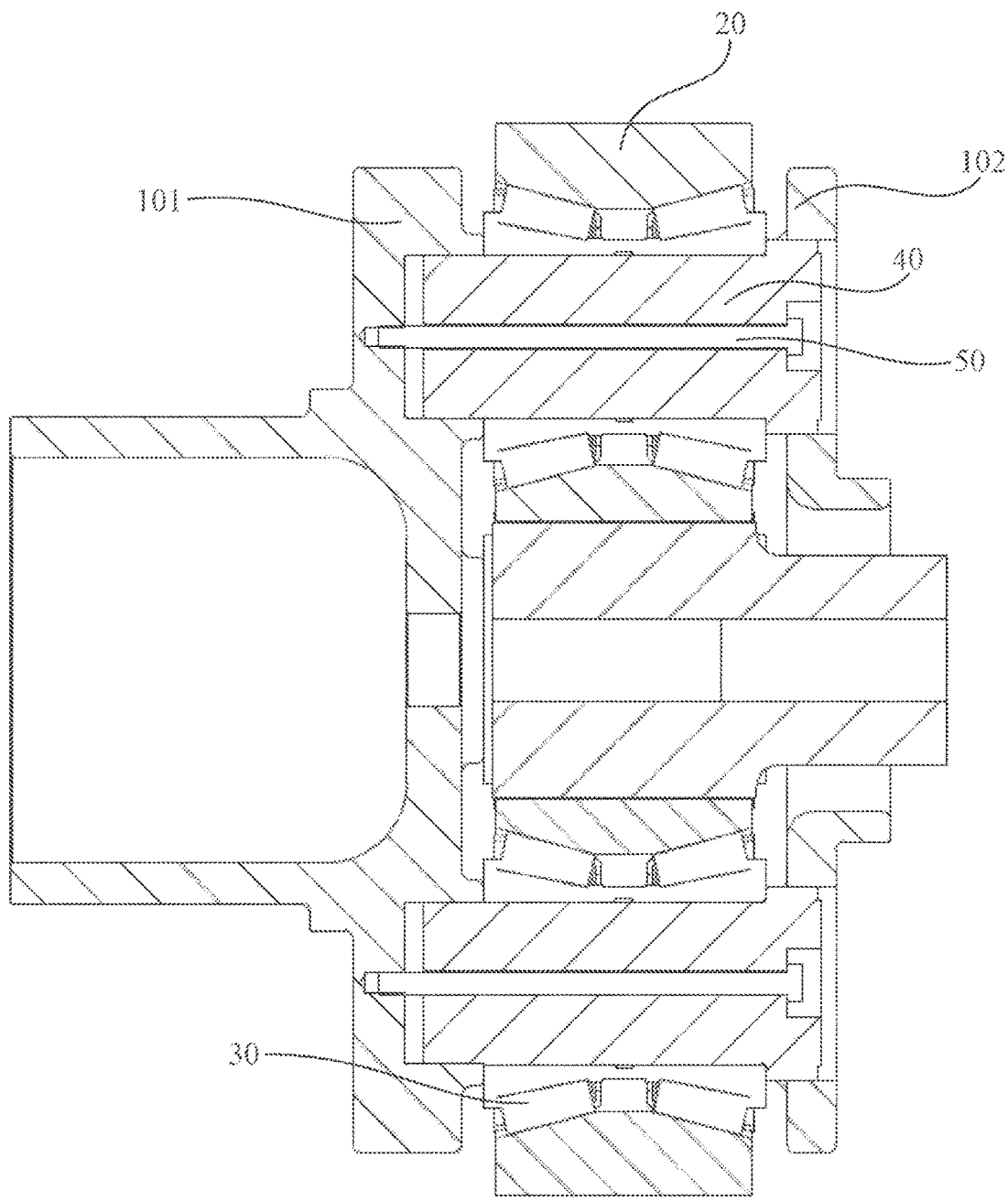
FIG. 2 shows a schematic cross-sectional view of a planetary carrier in the prior art with planetary gears and a sun gear.

In order to solve the defects in the prior art that planetary gear shafts are directly supported by web plates of a planetary carrier, and the planetary gear shafts are prone to deviation, the embodiments of present invention provide a planetary carrier in which planetary gears are less prone to deviation and a gear box comprising the planetary carrier.

A planetary carrier is provided, which comprises an input flange, a first web plate connected to the input flange, and a second web plate arranged opposite the first web plate, the planetary carrier further comprising a first support plate connected to the side of the first web plate that faces the second web plate and parallel to the first web plate, and a second support plate connected to the side of the second web plate that faces the first web plate and parallel to the second web plate, the first support plate and the second support plate being arranged opposite each other, wherein the side of the first support plate that faces the second support plate is provided with a plurality of first support portions, the number of first support portions is the same as that of planetary gear shafts, the side of the second support plate that faces the first support plate is provided with second support portions corresponding to the first support portions, and each first support portion and the second support portion corresponding to the first support portion are used for supporting one planetary gear shaft; and a first recessed portion is formed in the first support plate between every two adjacent first support portions, and a second recessed portion is formed in the second support plate between every two adjacent second support portions.

In an embodiment, the planetary gear shafts are not directly supported by the first web plate and the second web plate, so even if the first web plate and the second web plate undergo different degrees of deformation during operation, such a deformation is difficult to directly affect the planetary gear shafts. The provision of the first recessed portions and the second recessed portions increases the flexibility of the first support plate and the second support plate, avoiding relative torsional displacement between the first support plate on one side (e.g., rotor side) and the second support plate on the other side (generator side). Therefore, the relative inclination of the planetary gear shaft in the circumferential direction caused by the different torsional rigidities of the first web plate and the second web plate is avoided.

Preferably, the first web plate is connected to the second web plate by means of a plurality of connecting portions arranged in a circumferential direction.

Preferably, the first support plate comprises first connecting ribs each arranged between two adjacent first recessed portions and radially extending to one end of the connecting portion, and the second support plate comprises second connecting ribs each arranged between two adjacent second recessed portions and radially extending to the other end of the connecting portion.

Preferably, the first support portion comprises a first assembly hole, and one end of the planetary gear shaft is in interference fit with the first assembly hole.

Preferably, the second support portion comprises a second assembly hole, and the other end of the planetary gear shaft is in interference fit with the second assembly hole.

Preferably, a center of each of the first support portions or a center of each of the second support portions is provided with a threaded hole for a bolt for locking and fixing the planetary gear shaft.

Preferably, a first gap is formed between the first support portion and the first web plate.

Preferably, a second gap is formed between the second support portion and the second web plate.

The provision of the first gap and the second gap also increases a certain degree of flexibility of the first support plate and the second support plate, such that even if the first support plate and the second support plate undergo certain deformation, such a deformation may be tolerated by the first gap and the second gap, making it difficult to affect the planetary gear shafts. Furthermore, the provision of the first gap and the second gap may also isolate the different deformations caused by a bending moment of the first web plate on one side (e.g., rotor side) and the second web plate on the other side (e.g., generator side). That is, the deformation caused by the bending moment is borne by the first web plate, the second web plate, and the connecting portions that connect the first web plate and the second web plate, which almost does not cause relative deformation of the first support plate and the second support plate that support the planetary gear shafts, thereby avoiding the relative inclination of the planetary gear shaft in a radial direction.

Preferably, an outer diameter of the first support plate is less than an inner diameter of the first web plate, and an outer diameter of the second support plate is less than an inner diameter of the second web plate.

In an embodiment, the present invention further provides a gear box comprising a planetary carrier as described above.

The technical effects obtained by an embodiment of the present invention are as follows: the first and second web plates of the planetary carrier do not directly support the planetary gear shafts, such that the deformation of the web plates will not be transferred to the planetary gear shafts, thereby avoiding an uneven load for a planetary gear train caused by the deformation of the web plates. Additionally, the provision of the recessed portions and gaps further isolates the deformations of the web plates caused by a torque and a bending moment, thereby avoiding the inclinations of the planetary gear shaft in the circumferential direction and the radial direction.

Detailed Description of Embodiments

Specific implementations of embodiments of the present invention will be further described below with reference to the accompanying drawings.

Referring to FIGS. 3-7, a planetary carrier according to an embodiment of the present invention is described. The planetary carrier comprises an input flange 10, a first web plate 11 connected to the input flange 10, and a second web plate 12 arranged opposite the first web plate 11. The planetary carrier further comprises: a first support plate 13 connected to the side of the first web plate 11 that faces the second web plate 12 and parallel to the first web plate 11, and a second support plate 14 connected to the side of the second web plate 12 that faces the first web plate 11 and parallel to the second web plate 12, the first support plate 13 and the second support plate 14 being arranged opposite each other.

Figure 5:
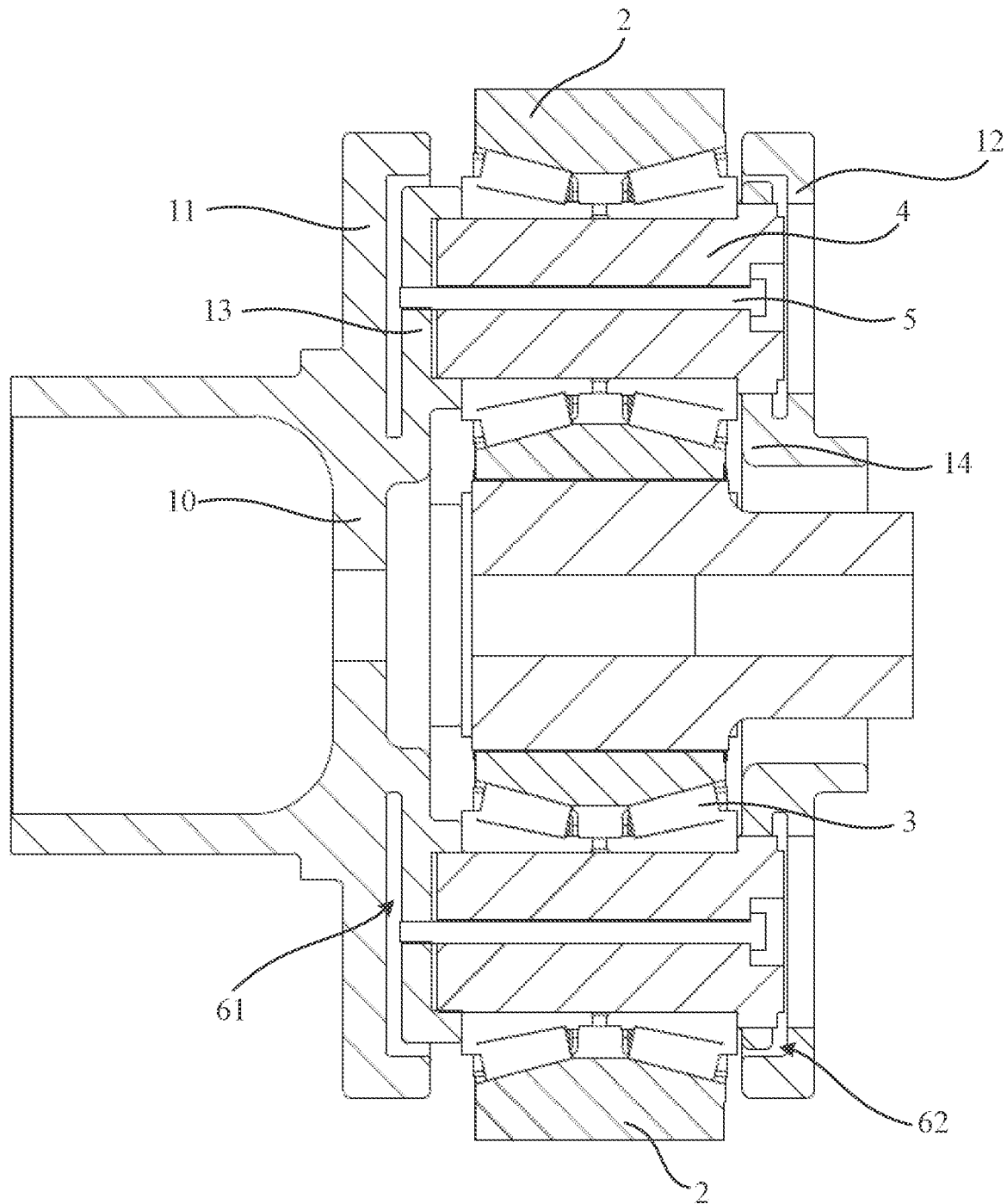
FIG. 5 shows a schematic cross-sectional view of a planetary carrier according to an embodiment of the present invention with planetary gears and a sun gear.
Figure 6:
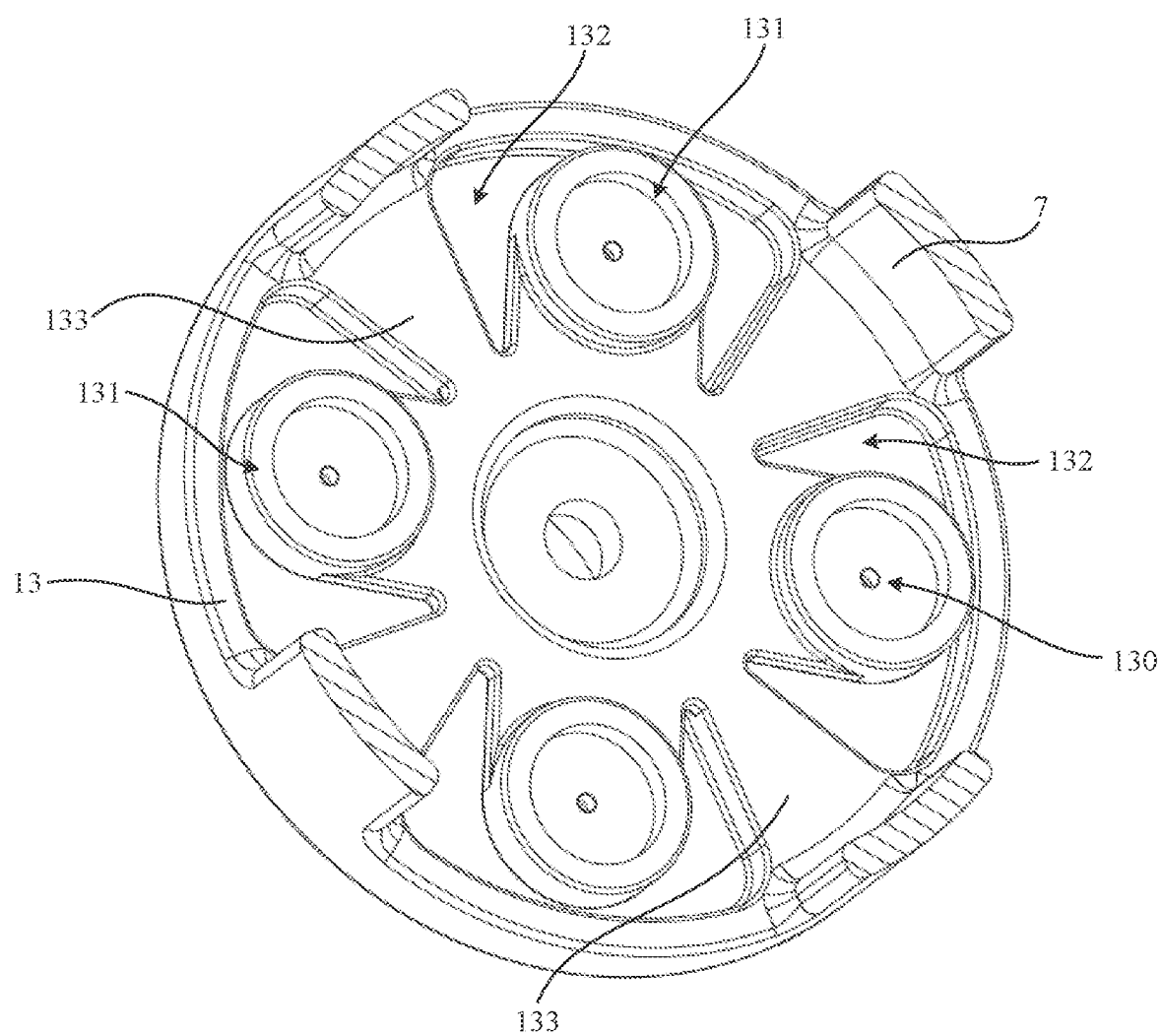
FIG. 6 shows a schematic diagram of a first support plate of a planetary carrier according to an embodiment of the present invention.
Figure 7:
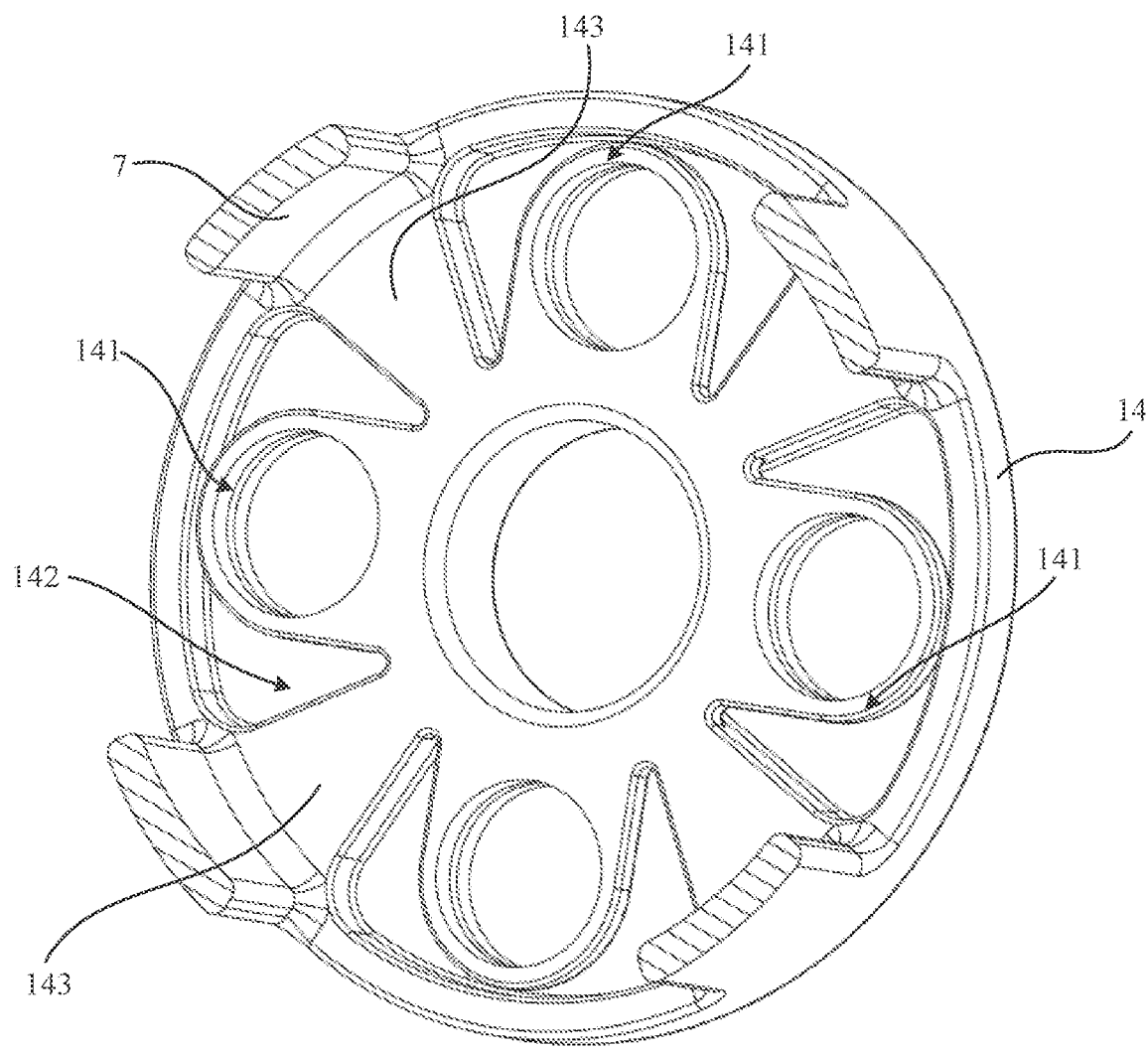
FIG. 7 shows a schematic diagram of a second support plate of a planetary carrier according to an embodiment of the present invention.

Referring mainly to FIGS. 6-7, the side of the first support plate 13 that faces the second support plate 14 is provided with a plurality of first support portions 131, the number of first support portions 131 is the same as that of planetary gear shafts 4, the side of the second support plate 14 that faces the first support plate 13 is provided with second support portions 141 corresponding to the first support portions 131, and each first support portion 131 and the second support portion 141 corresponding to the first support portion 131 are used for jointly supporting one planetary gear shaft 4 (FIG. 5). A planetary gear 2 is arranged on the planetary gear shaft 4 by means of a bearing 3.

A first recessed portion 132 is formed in the first support plate 13 between every two adjacent first support portions 131, and a second recessed portion 142 is formed in the second support plate 14 between every two adjacent second support portions 141. The provision of the first recessed portions 132 and the second recessed portions 142 increases the flexibility of the first support plate and the second support plate, avoiding relative torsional displacement between the first support plate on one side (e.g., rotor side) and the second support plate on the other side (generator side), thereby avoiding an uneven load on the planetary gear.

The first web plate 11 is connected to the second web plate 12 by means of a plurality of connecting portions 7 arranged in a circumferential direction. The first support plate 13 comprises first connecting ribs 133 each arranged between two adjacent first recessed portions 132 and radially extending to one end of the connecting portion 7, and the second support plate 14 comprises second connecting ribs 143 each arranged between two adjacent second recessed portions 142 and radially extending to the other end of the connecting portion 7. The first support portion 131 comprises a first assembly hole, and one end of the planetary gear shaft 4 is in interference fit with the first assembly hole. The second support portion 141 comprises a second assembly hole, and the other end of the planetary gear shaft 4 is in interference fit with the second assembly hole. In some embodiments, a center of each of the first support portions 131 is provided with a threaded hole 130 for a bolt 5 for locking and fixing the planetary gear shaft 4. In some other embodiments, a center of each of the second support portions 141 is provided with a threaded hole for a bolt for locking and fixing the planetary gear shaft.

Figure 3:
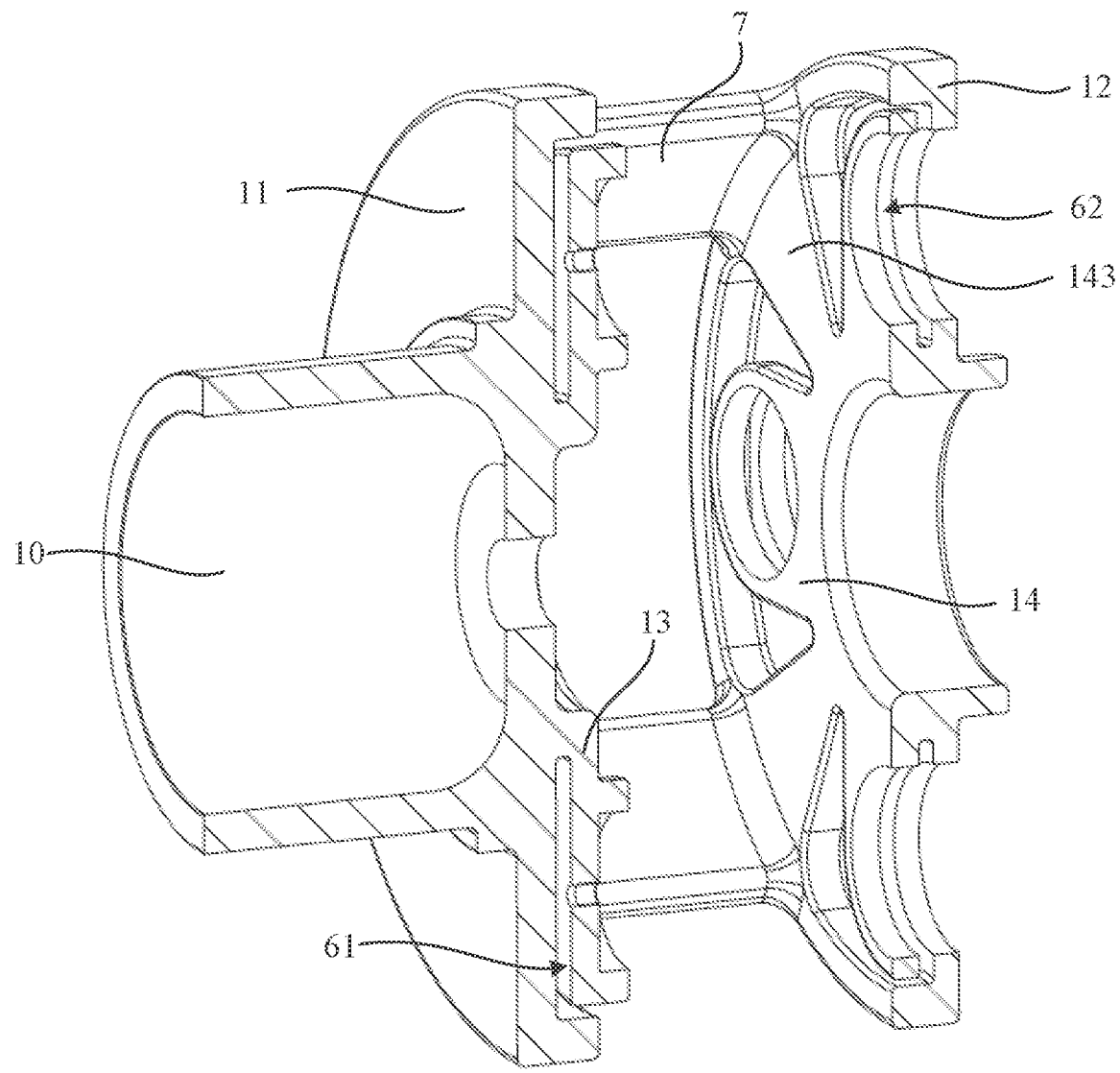
FIG. 3 shows a schematic diagram of a planetary carrier according to an embodiment of the present invention without planetary gears.
Figure 4:
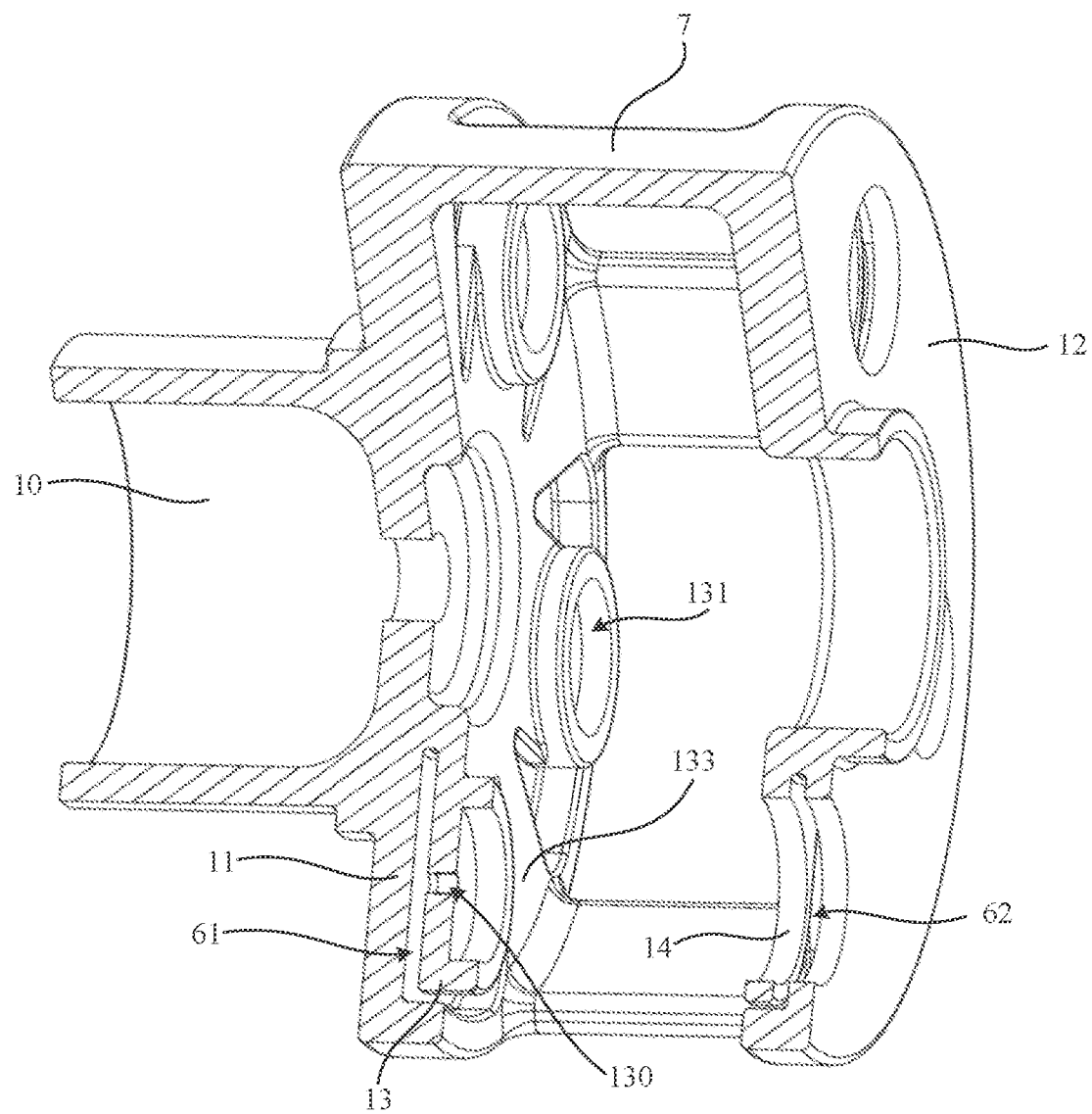
FIG. 4 shows a schematic diagram from another perspective of a planetary carrier according to an embodiment of the present invention without planetary gears.

Referring mainly to FIGS. 3-5, a first gap 61 is formed between the first support portion 131 and the first web plate 11. A second gap 62 is formed between the second support portion 141 and the second web plate. The existence of the first gap and the second gap further isolates the influence of the deformation of the first web plate and the second web plate on the planetary gear shaft.

An outer diameter of the first support plate 13 is less than an inner diameter of the first web plate 11, and an outer diameter of the second support plate 14 is less than an inner diameter of the second web plate 12.

An embodiment of the present invention further provides a gear box comprising a planetary carrier as described above, in particular, a wind turbine gear box where a planetary transmission is used. The planetary gear shaft is supported by the first support plate and the second support plate, such that a bending moment of the gear box during operation is difficult to radially and circumferentially affect the planetary gear shaft, thereby ensuring an even load on the planetary gear supported by the planetary gear shaft.

Although specific embodiments of the present invention are described above, it should be appreciated by those skilled in the art that these are merely illustrative. Various changes or modifications to these embodiments may be made by those skilled in the art without departing from the principle and spirit of the present invention, and these changes or modifications fall within the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A planetary carrier, comprising:
   an input flange;
   a first web plate connected to the input flange;
   a second web plate arranged opposite the first web plate;
   a first support plate connected to a side of the first web plate that faces the second web plate and parallel to the first web plate; and
   a second support plate connected to a side of the second web plate that faces the first web plate and parallel to the second web plate, the first support plate and the second support plate being arranged opposite each other, wherein;
   the side of the first support plate that faces the second support plate is provided with a plurality of first support portions,
   a number of first support portions is the same as that of planetary gear shafts,
   the side of the second support plate that faces the first support plate is provided with second support portions corresponding to the first support portions,
   each first support portion and the second support portion corresponding to a respective first support portion are used for supporting one planetary gear shaft,
   a first recessed portion is formed in a respective first support plate between every two adjacent first support portions, and
   a second recessed portion is formed in a respective second support plate between every two adjacent second support portions.

2. The planetary carrier of claim 1, wherein the first web plate is connected to the second web plate by a plurality of connecting portions arranged in a circumferential direction.

3. The planetary carrier of claim 2, wherein the first support plate comprises first connecting ribs each arranged between two adjacent first recessed portions and radially extending to one end of a respective connecting portion of the plurality of connecting portions, and
   wherein the second support plate comprises second connecting ribs each arranged between two adjacent second recessed portions and radially extending to the other end of the respective connecting portion.

4. The planetary carrier of claim 1, wherein each first support portion comprises a first assembly hole, and one end of each planetary gear shaft is in interference fit with the first assembly hole of a respective first support portion.

5. The planetary carrier of claim 1, wherein each second support portion comprises a second assembly hole, and an other end of the planetary gear shaft is in interference fit with the second assembly hole of a respective second support portion.

6. The planetary carrier of claim 1, wherein a center of each of the first support portions or a center of each of the second support portions is provided with a threaded hole for a bolt for locking and fixing a respective planetary gear shaft.

7. The planetary carrier of claim 1, wherein a first gap is formed between each first support portion and the first web plate.

8. The planetary carrier of claim 1, wherein a second gap is formed between each second support portion and the second web plate.

9. The planetary carrier of claim 1, wherein an outer diameter of the first support plate is less than an inner diameter of the first web plate, and an outer diameter of the second support plate is less than an inner diameter of the second web plate.

10. A gear box comprising the planetary carrier of claim 1.

* * * * *